(12) United States Patent
Georgiou et al.

(10) Patent No.: US 11,496,008 B2
(45) Date of Patent: Nov. 8, 2022

(54) ELECTRICAL MACHINES

(71) Applicant: Hamilton Sundstrand Corporation, Charlotte, NC (US)

(72) Inventors: Savvas Georgiou, Middlesex (GB); Tadashi Sawata, Coventry (GB); Andrew E. Page, Tring (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 129 days.

(21) Appl. No.: 16/718,260

(22) Filed: Dec. 18, 2019

(65) Prior Publication Data

US 2020/0381962 A1    Dec. 3, 2020

(30) Foreign Application Priority Data

Jun. 3, 2019  (EP) ..................................... 19275072

(51) Int. Cl.
| | |
|---|---|
| *H02K 1/14* | (2006.01) |
| *H02K 1/18* | (2006.01) |
| *H02K 1/02* | (2006.01) |
| *H02K 3/46* | (2006.01) |
| *H02K 5/04* | (2006.01) |
| *H02K 15/02* | (2006.01) |

(52) U.S. Cl.
CPC .............. *H02K 1/185* (2013.01); *H02K 1/02* (2013.01); *H02K 1/14* (2013.01); *H02K 3/46* (2013.01); *H02K 5/04* (2013.01); *H02K 15/028* (2013.01)

(58) Field of Classification Search
CPC .. H02K 1/18; H02K 1/02; H02K 1/14; H02K 15/02; H02K 3/46; H02K 5/04; H02K 1/185; H02K 15/0018
See application file for complete search history.

(56) References Cited

U.S. PATENT DOCUMENTS

| | | | |
|---|---|---|---|
| 5,227,687 A | 7/1993 | Baldwin et al. | |
| 6,487,769 B2 | 12/2002 | Ketterer et al. | |
| 6,766,572 B2 | 7/2004 | Dawson et al. | |
| 7,471,023 B2 | 12/2008 | Roundell | |
| 7,538,468 B2 * | 5/2009 | Kobayashi | ............. H02K 1/185 |
| | | | 310/216.049 |
| 7,581,307 B2 | 9/2009 | Stewart et al. | |
| 8,487,502 B2 * | 7/2013 | Kaiser | ...................... H02K 1/16 |
| | | | 310/216.009 |

(Continued)

FOREIGN PATENT DOCUMENTS

| | | |
|---|---|---|
| CN | 105071567 A | 11/2015 |
| CN | 207134879 U | 3/2018 |

(Continued)

OTHER PUBLICATIONS

Search Report for Application No. 19275072.7, dated Nov. 21, 2019, 8 pages.

*Primary Examiner* — Leda T Pham
(74) *Attorney, Agent, or Firm* — Cantor Colburn LLP

(57) ABSTRACT

An electrical machine comprises a stator and a housing. The housing has an internal bore. The stator comprises an annular core mounted within the bore of the housing. The core comprises at least one key projecting radially outwardly from a radially outer surface thereof. The housing comprises at least one keyway in the bore. The at least one key of the core being received within the at least one keyway of the housing.

16 Claims, 5 Drawing Sheets

(56) References Cited

U.S. PATENT DOCUMENTS

| | | | | |
|---|---|---|---|---|
| 8,816,546 | B2* | 8/2014 | Bywaters | H02K 1/20 |
| | | | | 310/54 |
| 9,531,221 | B2 | 12/2016 | Inuzuka | |
| 10,673,289 | B2* | 6/2020 | Nakagawa | D06F 37/304 |
| 2004/0245883 | A1* | 12/2004 | Mitcham | H02K 1/20 |
| | | | | 310/261.1 |
| 2007/0273239 | A1* | 11/2007 | Kobayashi | H02K 1/185 |
| | | | | 310/216.044 |
| 2016/0241090 | A1* | 8/2016 | Nakagawa | H02K 1/185 |
| 2017/0358965 | A1 | 12/2017 | Pithwa | |

FOREIGN PATENT DOCUMENTS

| | | |
|---|---|---|
| CN | 109217544 A | 1/2019 |
| DE | 102012215232 A1 | 3/2014 |
| EP | 2814138 A1 | 12/2014 |
| EP | 2860847 A1 | 4/2015 |
| TW | 201230615 A | 7/2012 |

\* cited by examiner

ELECTRICAL MACHINES

FOREIGN PRIORITY

This application claims priority to European Patent Application No. 19275072.7 filed Jun. 3, 2019, the entire contents of which is incorporated herein by reference.

TECHNICAL FIELD

The present disclosure relates to electrical machines.

BACKGROUND

Electrical machines such as motors and generators typically comprise a stator and a rotor arranged radially within the stator. The stator typically comprises an annular stator core which receives stator coils. The stator core is mounted within a housing and typically comprises a plurality of core plates laminated together to form the core. The core may be made up from a plurality of circumferentially adjacent core segments which are assembled together in a ring to create the core.

Electrical machines may be subjected to mechanical stresses mainly induced by vibration and torque loading during use and also to thermal stresses due to dissimilar expansion rates of the materials used in their construction. To ensure a good mechanical connection between the core and the stator housing, the core is typically received with an interference fit within the housing. Thus, the external diameter of the stator core is larger than the internal diameter of the stator housing and the two components must be press fitted and/or shrink fitted together.

Many electrical machines use core materials having magnetic permeability and low magnetic hysteresis. Examples of such materials are Cobalt Iron (CoFe) and Silicon Iron (SiFe). CoFe is a particularly advantageous material having excellent magnetic properties. It is therefore used in high performance machines. However, it has been found that the compressive stresses introduced into the external diameter of the core due to the interference fit with the stator housing adversely affect the magnetic properties of the material of the core, thereby reducing the effectiveness of the core material and the performance of the electrical machine.

SUMMARY

From a first aspect, the disclosure provides an electrical machine comprising a stator and a housing. The housing has an internal bore. The stator comprises an annular core mounted within the bore of the housing. The core comprises at least one key projecting radially outwardly from a radially outer surface thereof. The housing comprises at least one keyway in the bore. The at least one key of the core is received within the at least one keyway of the housing.

In certain embodiments, the core may be retained axially in the housing by at least one retaining element extending over an axial end face of the core.

In some embodiments, the keyway may comprise a shoulder at one axial end thereof with the corresponding key of the core being retained between the shoulder and the retaining element. In other embodiments, the core may be retained between respective retaining elements provided at opposite ends of the core.

The at least one retaining element may comprise a plurality, for example three, clamping plates mounted to an axial end surface of the housing and radially overlapping the axial end face of the core.

In other embodiments, the core may be retained in the stator housing by means of an interference fit between the key of the core and the keyway of the housing.

In various embodiments, the at least one key formed on the core and the at least one keyway formed in the housing have a form interlocking shape, for example a dovetail shape.

In some embodiments, the key may comprise an enlarged or flared head portion and a neck portion extending from the flared head portion to the radially outer surface of the core, and the keyway may comprise an enlarged or flared base portion and a neck portion extending therefrom to the bore.

In such embodiments, there may be an interference fit only between the head portion of the core key the base portion of the keyway.

In embodiments of the disclosure, the core may comprise a plurality of circumferentially adjacent segments, each segment comprising at least one key. In alternative embodiments, the core may be a one piece core.

In embodiments of the invention, the core is made from CoFe.

The disclosure also provides an electrical machine as described in the paragraphs above further comprising a rotor arranged radially within the core.

The disclosure also extends to an annular core or core element for mounting within the bore of a housing of an electrical machine, the core comprising at least one key projecting radially outwardly from a radially outer surface thereof.

The disclosure also extends to a method of assembling an electrical machine (6) as described above comprising the steps of mounting the core to the housing by positioning the at least one key of the core within the at least one keyway of the housing.

The method may further comprise retaining the at least one key of the core within at least one keyway of the housing by means of at least one retaining element mounted over an end face of the core.

An alternative method comprises retaining the at least one key of the core within at least one keyway of the housing by means of creating an interference fit between the at least one key of the core and the at least one keyway of the housing.

The disclosure also extends to a method of repairing certain electrical machines in accordance with the disclosure comprising removing at least one retaining element from the housing; removing at least one core segment from the housing; replacing the at least one core segment with a replacement core segment; and mounting the or a replacement retaining element to the housing to retain the replacement core segment in the housing.

BRIEF DESCRIPTION OF DRAWINGS

Some embodiments of the disclosure will now be described by way of example only, with reference to the accompanying drawings in which.

DETAILED DESCRIPTION

Figure 1:
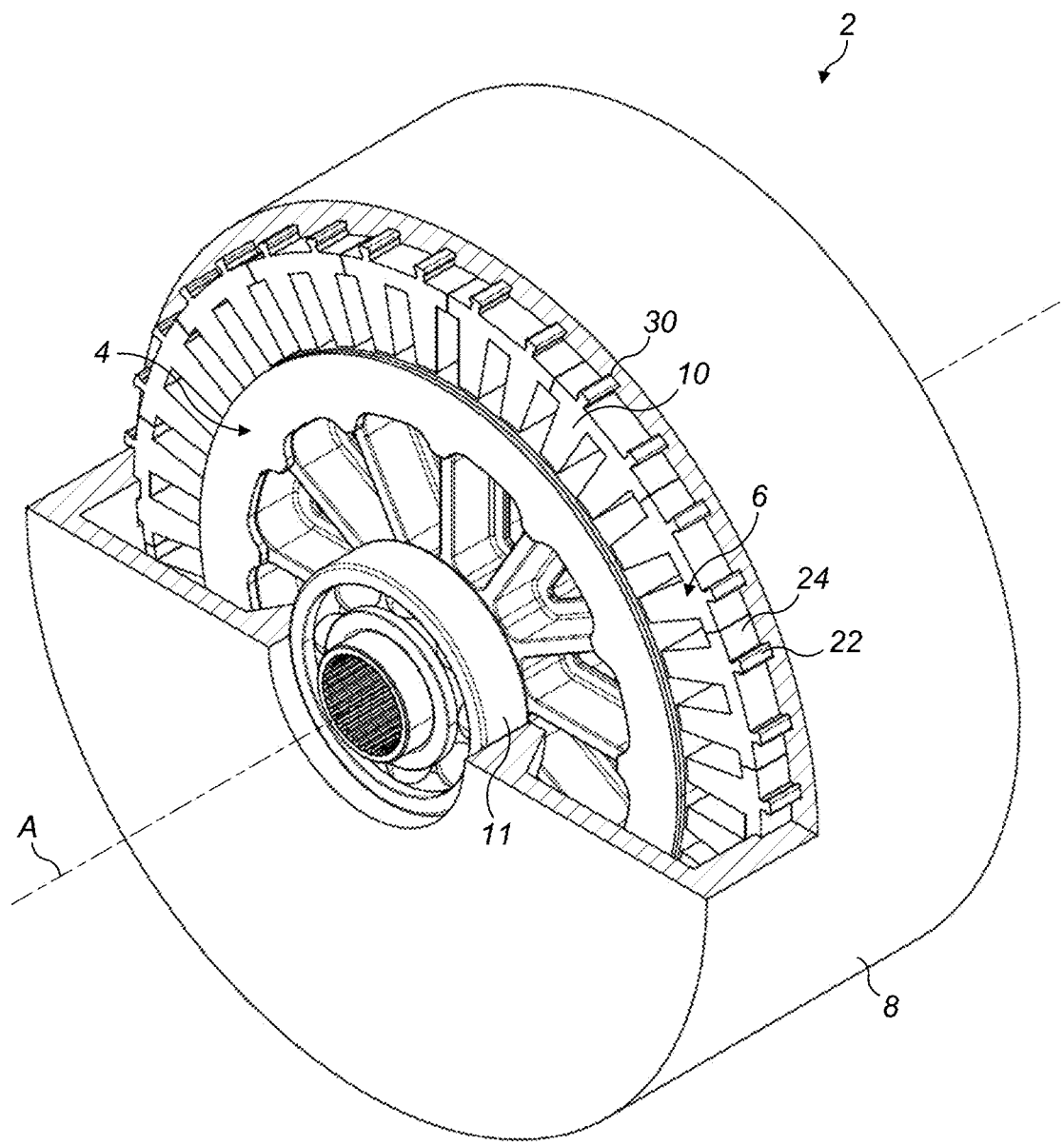
FIG. 1 shows, schematically, a partially cut away electrical machine in accordance with the disclosure.
Figure 2:
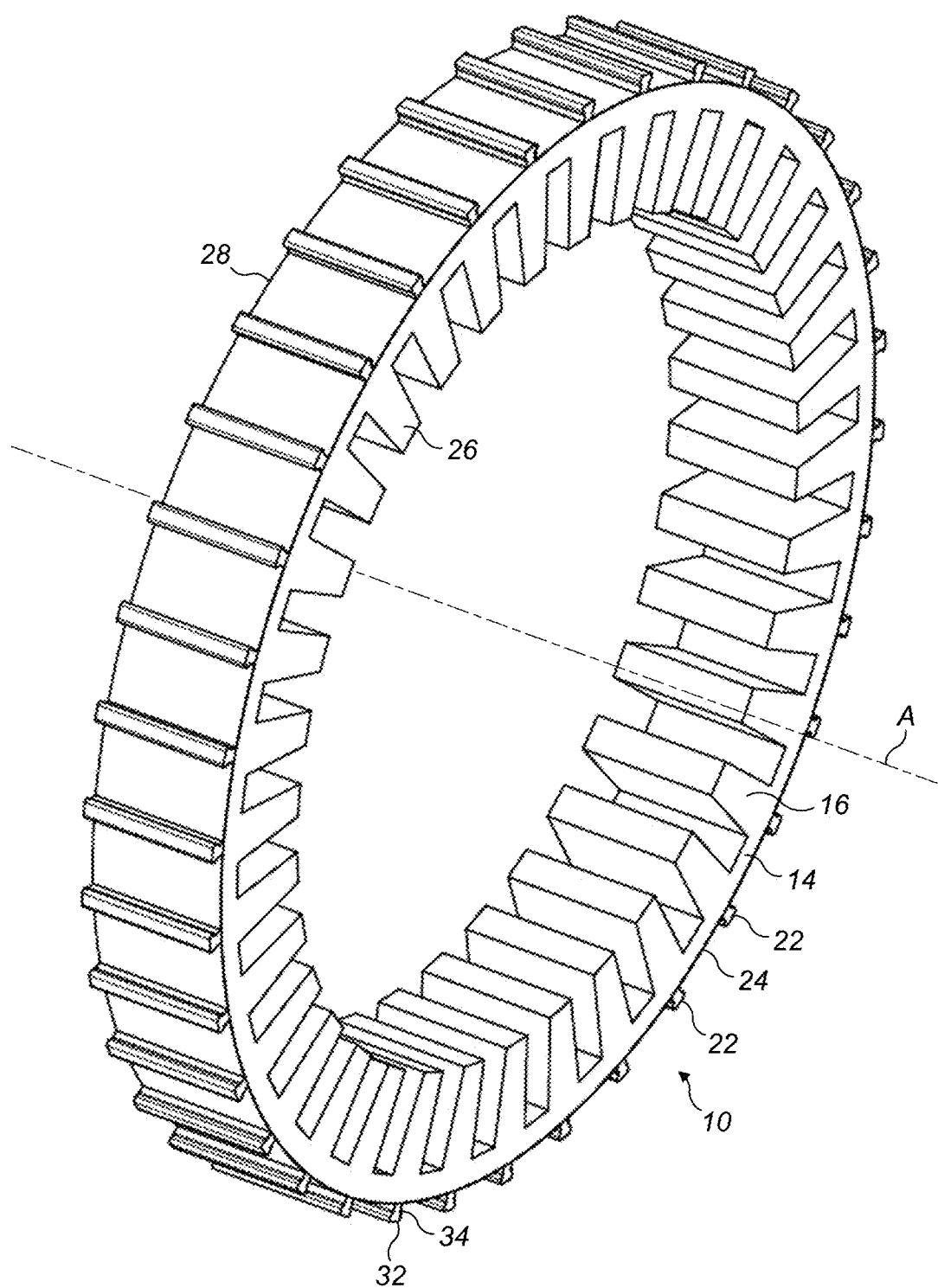
FIG. 2 shows a core in accordance with the disclosure.

With reference to FIG. 1, an electrical machine 2 such as a motor or generator comprises a rotor 4 and a stator 6. The rotor 4 is arranged radially within the stator 6 and rotates about an axis A. The rotor 4 acts as either an output or an input depending on whether the machine 2 is a motor or a generator.

The stator 6 is mounted within a housing 8. Typically the housing 8 may be formed in two parts and may fully encapsulate the active parts of the machine 2. It may contain bearings 11 for the rotor 4 and provide mounting locations for other components such as connectors, etc.

The stator 6 comprises a core 10. The core 10 may further comprise insulation pieces and coils (not shown for clarity purposes). The housing 8 comprises an internal bore 12 within which the core 10 is received.

The core 10 comprises an annular core body 14 with radially inwardly extending teeth 16 around which coils (as stated above not shown for clarity purposes) are wound. The number of teeth 16 will depend on the machine in question. The annular core body 14 may be made from any suitable material, but in particularly advantageous embodiments is made from SiFe or more preferably CoFe due to the excellent electromagnetic properties of the latter. While these materials are of particular interest, the disclosure applies to all core materials.

Figure 3:
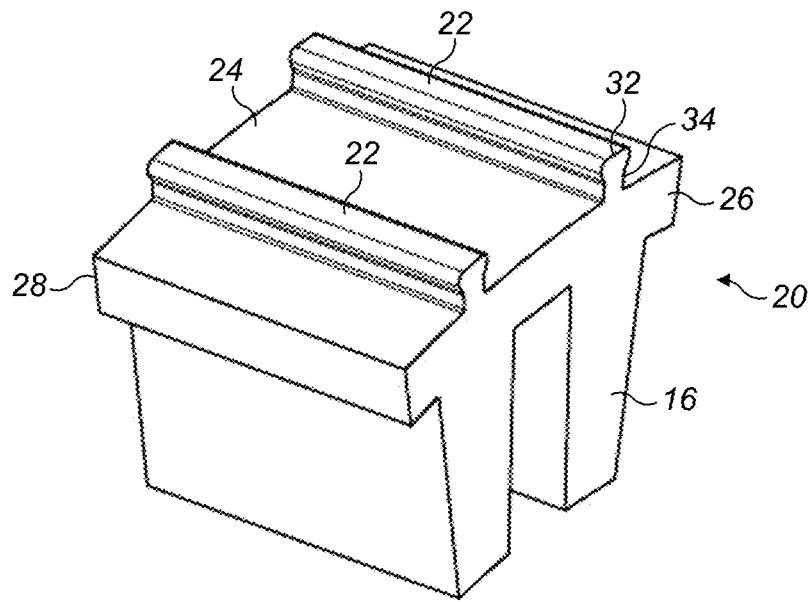
FIG. 3 shows a core segment in accordance with the disclosure.
Figure 4:
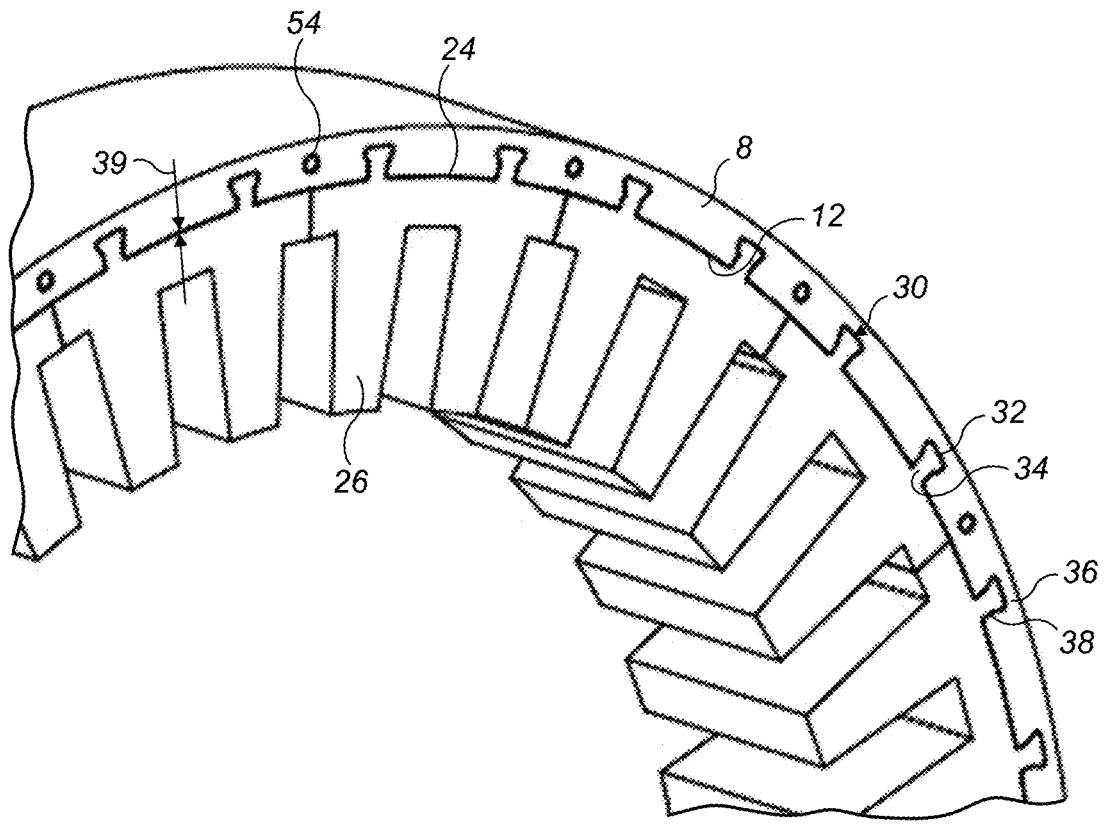
FIG. 4 shows a first electrical machine in accordance with the disclosure with a plurality of core segments of FIG. 3 mounted in a housing.

As is known in the art, the core body 14 may be constructed from laminated plates of the core material. As is also known in the art, and as illustrated in FIGS. 3 and 4, the core body 14 may be constructed from a plurality of circumferentially adjacent core segments 20 which when assembled form the annular core 10. As illustrated in FIGS. 3 and 4, each core segment 20 has two teeth 16, although the number of teeth 16 per core segment 20 may vary from machine to machine.

As described so far, the stator 6 construction is conventional. However, in accordance with the disclosure the core 10 is mounted to the housing 8 in a different manner from traditional machines in which the external radial surface of the core 10 is interference fitted into the internal bore 12 of the housing 8.

In accordance with this disclosure, the core 10 is provided with a plurality of circumferentially spaced keys 22 which project radially outwardly from a radially outer surface 24 of the annular core body 14. By radially outwardly is meant in a direction which has a radially outward component. The keys 22 may extend outwardly along a radius or be inclined to a radius. In this embodiment, there are thirty six keys 22, but the number may vary in other embodiments. The precise number may depend for example upon the size of the stator 10, the number of core segments 20 (if the core 10 is made from segments 20 as shown in FIGS. 3 and 4), the stresses in the keys 22, their torque transmitting capability, their resistance to axial movement, mechanical constraints in the housing 8, their manufacturability and so on. In the embodiment of FIGS. 3 and 4, each core segment 20 has two keys 22, although that number may vary from machine to machine.

In this embodiment, the keys 22 extend the entire axial length of the core body 14 from a front face 26 of the core body 14 to a rear face 28 of the core body 14. However, that may not be necessary in all embodiments and in other embodiments, the keys 22 may extend over only a portion of the axial length of the core body 14.

In this embodiment, the keys 22 extend parallel to the longitudinal axis A of the core 10, but again that is not essential.

The bore 12 of the housing 8 comprises a plurality of keyways 30 for receiving the keys 22 of the core 10. The number of keyways 30 corresponds to the number of keys 22 in this embodiment. The axial arrangement of the keyways 30 is the same as that of the keys 22. Thus in the described embodiment, the keyways 30 also extend parallel to the axis A of the machine 2.

As can be seen from FIG. 4, for example, the shape of a keyway 30 is generally complementary to that of a key 22. In the illustrated embodiment, the key 22 has a generally dovetail shape, having a flaring head portion 32 and a neck portion 34 extending between the head portion 32 and the outer surface 24 of the core body 14. The keyway 30 therefore also has a generally dovetail shape with a flaring base portion 36 and a neck portion 38 extending therefrom to the bore 12.

In this embodiment, the keys 22 of the core 10 are received as a loose or sliding fit within the keyways 30 of the housing 8, and there is no interference therebetween. There is also a clearance 39 between the bore 12 and the outer surface 24 of the annular core body 14.

The interlocking shape of the keys 22 and keyways 30 locates the core 10 radially within the housing 8. However, as there is no interference between the keys 22 and keyways 30, the core 10 must also be retained axially within the housing 8. In this embodiment, the keyways 30 do not extend the entire axial length of the housing 8. Rather each terminates at an internal shoulder 40 at one axial end 42 thereof. The keys 22 of the core 10 are inserted within the respective keyways 30 such that they abut the shoulders 40. This locates the core 10 in one axial direction. To retain the core 10 in the opposite axial direction, one or more retaining elements 44 are mounted over the front face 26 of the core 10. The retaining elements 44 advantageously extend radially inward of the keys 22 to engage with the main core body 14.

In some embodiments, the retaining elements 44 may be formed by an adjacent part of the machine itself, such as an end frame. In other embodiments, such as the embodiment illustrated here, dedicated retaining elements 44 are provided.

Figure 5:
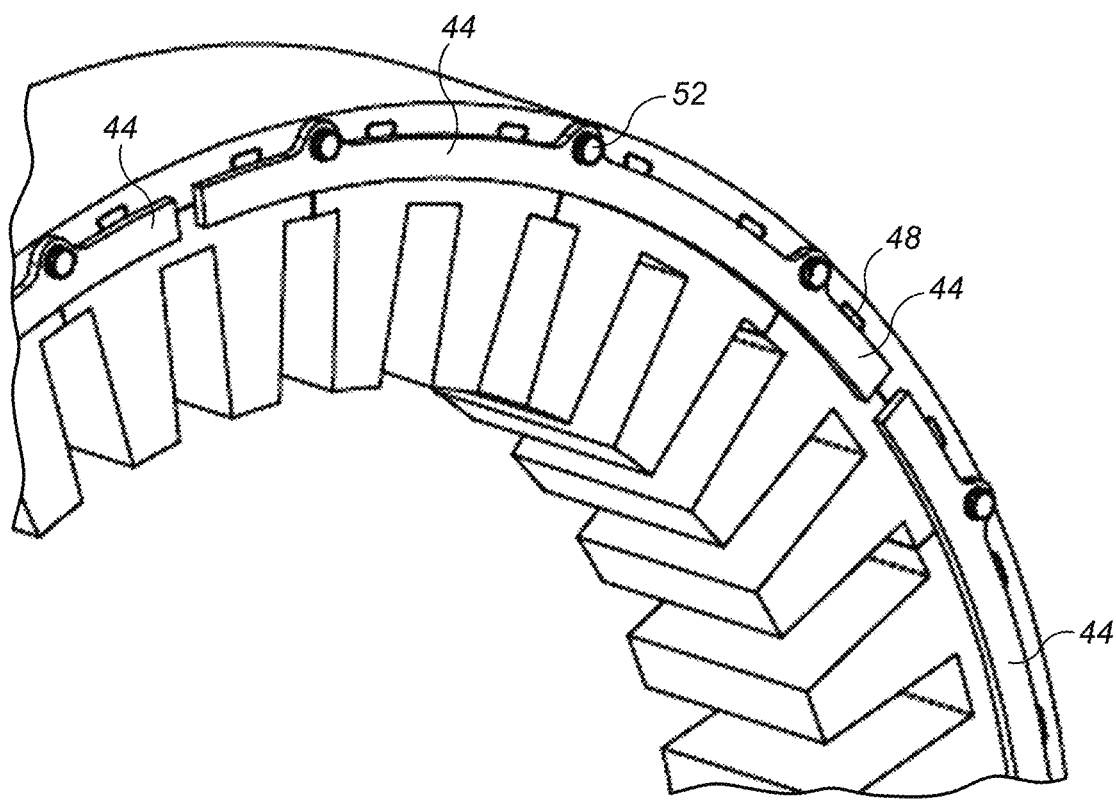
FIG. 5 shows the retention of the core segments of FIG. 4 in the housing.
Figure 6:
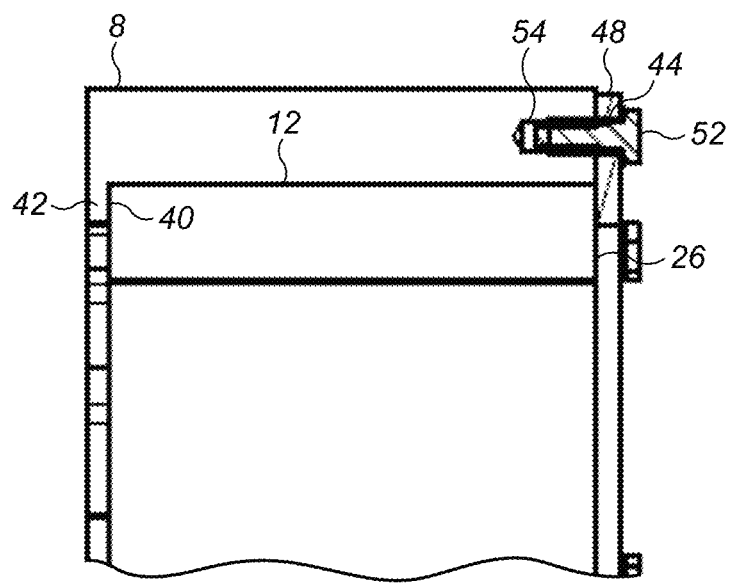
FIG. 6 shows a longitudinal section through FIG. 5.

In the illustrated embodiment, the retaining element 44 is mounted to an axial end surface 48 of the housing 8 so as to at 1 overlap the front face 26 of the core 10. As can be seen from FIGS. 5 and 6, the retaining element 44 is mounted to the housing 8 by threaded fasteners 52 which are received in circumferentially spaced threaded bores 54 formed in the axial end surface 48 of the housing 8.

The retaining element 44 may be formed as a unitary annular plate, in the embodiment illustrated, it is formed as a plurality of circumferentially arranged retaining elements 44, each individually mounted to the housing 8. In one example, three retaining elements 44 may be provided, each extending circumferentially for about 120°

While a shoulder 40 has been illustrated in each keyway 30 of the housing 8, in other embodiments, to facilitate manufacture the keyways 30 may extend through the complete axial length of the stator body. In such embodiments, one or more retaining elements 44 may be provided over both axial end faces 26, 28 of the core 10 for retaining the core 10 axially. Alternatively, one or more stop elements may be mounted in one or more keyways 30 to form the shoulder 40.

The embodiment of the disclosure described above have a number of potential advantages. Firstly, it does not require any interference fitting between the housing 8 and the core 10. The keys 22 of the core 10 or core segments 20 may simply be slid into the keyways 30 of the housing bore 12 and retained in position by the retaining elements 44.

It also means that the core 10 may also be removed easily from the housing 8 simply by removing the retaining elements 44 and sliding the core 10 from the housing 8. This may be of importance when maintaining or repairing the machine. This may be particularly so in embodiments using individual core segments 20. In multi-phase machines, if the number of teeth 16 per core segment 20 and the number of coils per phase is the same, then it may be possible to wind all the coils on one phase onto one core segment 20. As such, it would be possible to remove and replace a set of damaged coils without removing the whole stator core 10, by simply removing the relevant core segment 20, considerably facilitating maintenance and repair.

Figure 7:
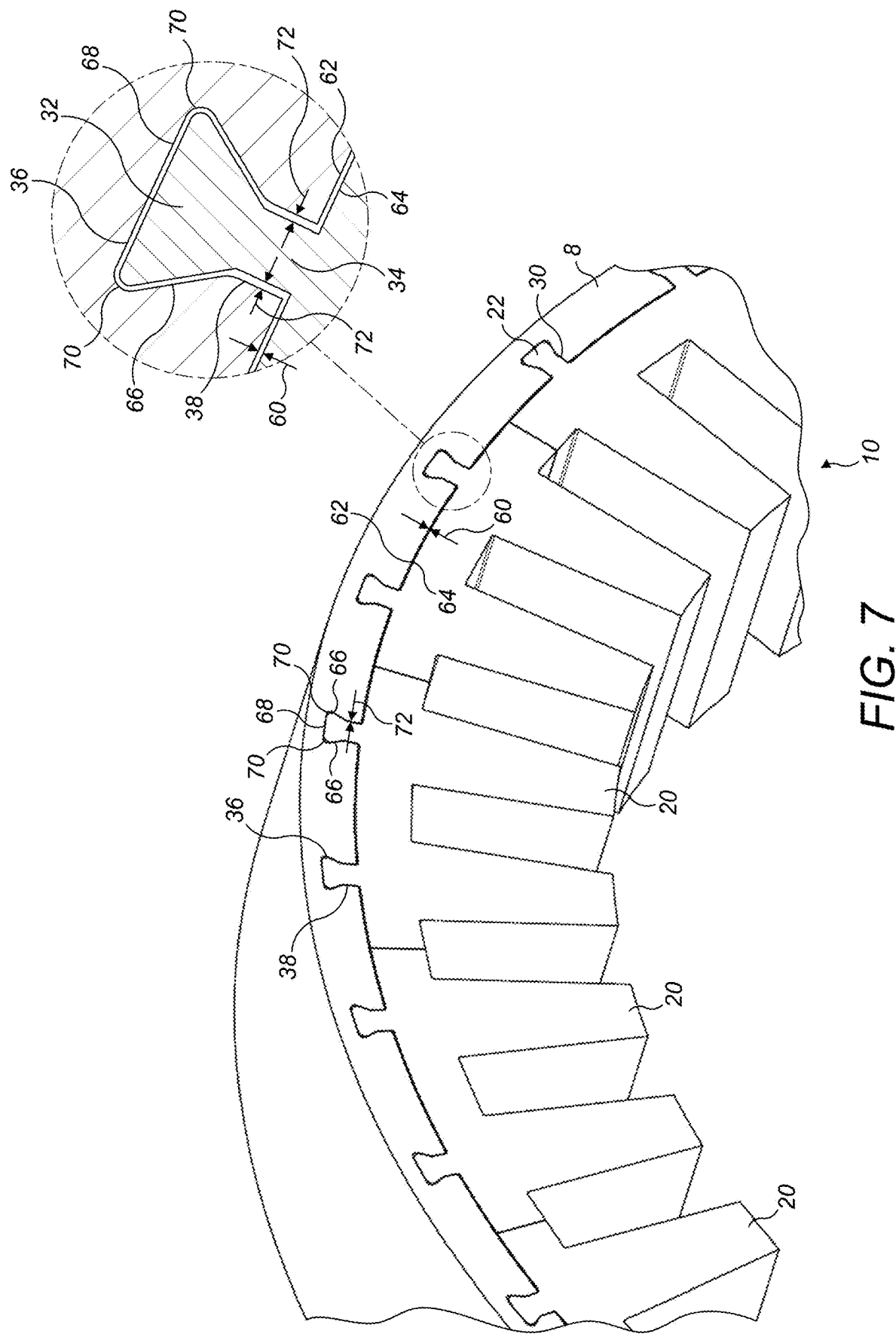
FIG. 7 shows a detail of a second electrical machine construction in accordance with the disclosure.

With reference now to FIG. 7, a second embodiment of the disclosure is illustrated.

In this embodiment, rather than retaining the core 10 or core segments 20 by retaining elements 44, the core 10 or core elements 20 are retained by virtue of an interference fit between the keys 22 of the core 10 or core segments 20 and the keyways 30 of the housing 8. However this interference fit is only between the keys 22 and keyways 30, there being a clearance 60 between the inner diameter 62 of the housing bore 12 and the outer diameter 64 of the core or core segment body 14.

In the illustrated embodiment, the keys 22 and keyways 30 have a dovetail shape, as in the earlier embodiment. Thus each key 22 a has a flaring head portion 32 and a neck portion 34 extending between the head portion 32 and the outer surface 24 of the core or core segment body 14 and each keyway 30 has a generally dovetail shape with a flaring base portion 36 and a neck portion 38 extending therefrom to the bore 12.

In certain embodiments of the disclosure, and as illustrated, an interference fit is only created between the head portions 32 of the keys 22 and the base portions 36 of the keyways 30. In particular, an interference may be created at the sloping and radially outward interfaces 66, 68 between the key head portion 32 and keyway base portion 36. As shown, a relief clearance 70 may be formed in the corner regions between these interfaces 66, 68. This facilitates sliding of the keys 22 within the keyways 30 during assembly. There is also a clearance 72 between the neck portion 34 of each key 22 and the neck portion 38 of each keyway. This localises the compressive stresses caused by the interference fit to the portion of the key 22 remote from the from the main core body 14, thereby minimising compressive forces in the main core body 14, thereby mitigating any deleterious effects on the electromagnetic properties of the core 10.

To mount the core 10 or core segments 20 to the housing 8, the housing 8 may be heated and/or the core 10 or core segments 20 cooled to allow the keys 22 to be inserted into the keyways 30.

The embodiment above is advantageous in that it does not require separate retaining elements 44 to be provided, while at the same time not significantly adversely affecting the electromagnetic properties of the core 10. The keys 22 are designed such that mechanical stresses are contained substantially within the keys 22 only, thereby not affecting the core 10 in the main magnetic flux paths of the machine 2. Therefore, the performance of the machine 2 is not affected by the interference fitting.

It will be understood that the embodiments described above are merely illustrative of the disclosure and that modifications may be made thereto without departing from the scope of the disclosure.

For example, while the keys 22 and keyways 36 have been illustrated as being shaped as dovetails, other shapes would be possible. For example the keys 22 and keyways 36 may be generally T-shaped. In other embodiments they may be rectangular in section. In yet further embodiments, the keys 22 and keyways 36 could have a cylindrical shape.

The disclosure applies to all manner of rotary electrical machines but finds particular application in high performance machines such as electric propulsion motors and generators. While particularly beneficial in machines using CoFe as a core material, it may also be used in machines employing other core materials.

The invention claimed is:

1. An electrical machine comprising:
a stator; and
a housing having an internal bore;
the stator comprising an annular core removably mounted within the bore of the housing; wherein:
the core comprises at least one key projecting radially outwardly from a radially outer surface thereof;
the housing comprises at least one keyway in the bore;
the at least one key of the core being received within the at least one keyway of the housing;
the core comprises a plurality of circumferentially adjacent segments, each segment comprising at least one key of the at least one key; and
the core is retained axially in the housing by at least one retaining element extending over an axial end face of the core, wherein the at least one retaining element is removable from the housing to allow at least one segment of the core to be removed from the housing.

2. The electrical machine as claimed in claim 1, wherein the at least one keyway comprises a shoulder at one axial end thereof, the corresponding at least one key of the core being retained between the shoulder and the retaining element.

3. The electrical machine as claimed in claim 2, wherein the at least one retaining element comprises a plurality of clamping plates mounted to an axial end surface of the housing and radially overlapping the axial end face of the core.

4. The electrical machine as claimed in claim 3, wherein the plurality of clamping plates includes three clamping plates.

5. The electrical machine as claimed in claim 1, wherein the at least one key formed on the core and the at least one keyway formed in the housing have a form interlocking shape.

6. The electrical machine stator as claimed in claim 5, wherein the at least one key comprises an enlarged or flared head portion and a neck portion extending from the flared head portion to the radially outer surface of the core, and the at least one keyway comprises an enlarged or flared base portion and a neck portion extending therefrom to the bore.

7. The electrical machine stator as claimed in claim 6, wherein the core is retained in the housing an interference fit between the at least one key of the core and the at least one keyway of the housing and wherein there is an interference fit only between the head portion of the at least one key and the base portion of the at least one keyway.

8. The electrical machine as claimed in claim 5, wherein the interlocking shape is a dovetail shape.

9. The electrical machine as claimed in claim 1, wherein the core is made from CoFe.

10. The electrical machine as claimed in claim 1, further comprising a rotor arranged radially within the core.

11. A method of assembling the electrical machine as claimed in claim 1 comprising:
   mounting the core to the housing by positioning the at least one key of the core within the at least one keyway of the housing.

12. The electrical machine of claim 1, wherein the at least one retaining element is mounted to the housing by threaded fasteners.

13. A method of repairing an electrical machine that includes a stator and a housing having an internal bore, wherein the stator includes an annular core mounted within the bore of the housing, and wherein: the core comprises at least one key projecting radially outwardly from a radially outer surface thereof; the housing comprises at least one keyway in the bore; and the at least one key of the core being received within the at least one keyway of the housing;
   wherein the core is retained axially in the housing by at least one retaining element extending over an axial end face of the core and wherein the core comprises a plurality of circumferentially adjacent segments, each segment comprising at least one key of the at least one key, the method comprising:
   removing at least one retaining element from the housing;
   removing at least one core segment from the housing;
   replacing the at least one core segment with a replacement core segment; and
   mounting a replacement retaining element to the housing to retain the replacement core segment in the housing.

14. The method of claim 13, wherein the replacement retaining element is different than the at least one retaining element.

15. The method of claim 13, wherein the replacement retaining element is the same as the at least one retaining element.

16. An electrical machine comprising:
   a stator; and
   a housing having an internal bore;
   the stator comprising an annular core mounted within the bore of the housing; wherein:
   the core comprises at least one key projecting radially outwardly from a radially outer surface thereof;
   the housing comprises at least one keyway in the bore;
   the at least one key of the core being received within the at least one keyway of the housing;
   the core comprises a plurality of circumferentially adjacent segments, each segment comprising at least one key of the at least one key; and
   the core is retained in the housing by an interference fit between the at least one key of the core and the at least one keyway of the housing, wherein the at least one key formed on the core and the at least one keyway formed in the housing have a form interlocking shape, the at least one key comprises an enlarged or flared head portion and a narrower neck portion extending from the flared head portion to the radially outer surface of the core, the at least one keyway comprises an enlarged or flared base portion and a narrower neck portion extending therefrom to the bore, and there is an interference fit only between the head portion of the at least one key and the base portion of the at least one keyway.

* * * * *